(12) United States Patent
LaMedica, Jr. et al.

(10) Patent No.: US 6,381,472 B1
(45) Date of Patent: Apr. 30, 2002

(54) TDD/TTY-DIGITAL ACCESS

(75) Inventors: Louis LaMedica, Jr., Pittstown; Lee J. Whritenour, West Milford, both of NJ (US)

(73) Assignee: Bell Atlantic Mobile, Inc., Bedminster, NJ (US)

( * ) Notice: Subject to any disclaimer, the term of this patent is extended or adjusted under 35 U.S.C. 154(b) by 0 days.

(21) Appl. No.: 09/217,248

(22) Filed: Dec. 21, 1998

(51) Int. Cl.[7] .................................................. H04B 1/38
(52) U.S. Cl. ........................ 455/560; 455/557; 379/52; 379/93.18
(58) Field of Search ................................ 455/557, 556, 455/560, 507; 379/52, 93.17, 93.18

(56) References Cited

U.S. PATENT DOCUMENTS 5,974,116 A * 10/1999 Engelke et al. ............... 379/52
6,205,339 B1 * 3/2001 Leung et al. ................ 455/553

* cited by examiner

*Primary Examiner*—Lee Nguyen
(74) *Attorney, Agent, or Firm*—McDermott, Will & Emery

(57) ABSTRACT

Digital wireless telephone equipment is adapted to support existing data services for the hearing or speech impaired. The data devices use existing analog tone transmission protocols. The digital telephone equipment provides protocol conversions between the standard tone signals used by TDD/TTY devices or the like and data messages in the form of a standard data protocol utilized within the air-link of the digital wireless telephone system. In either direction, each tone generated by the data device is detected. Upon detection of one or more tones, a protocol converter generates a data message signifying the bit(s) represented by the tone signals in a format used by the air-link protocol. The converter supplies the data message to the appropriate digital radio transceiver. The transceiver inserts the message into the data stream with any other information for the pertinent subscriber, such as vocoded audio information. The transceiver sends the combined data stream over the air-link. Another unit receiving the transmission reverses the process to recover the messages and generate corresponding tone signals. The tone signals can be mixed in with any received audio information, enabling a person to send and/or receive verbal communications along with the textual communications.

4 Claims, 4 Drawing Sheets

TDD/TTY-DIGITAL ACCESS

TECHNICAL FIELD

The present invention relates to techniques for effectively coupling a data communication device for a speech or hearing impaired user, such as a TDD or TTY, to a digital wireless telephone unit, to enable communication for the impaired user through a digital wireless telephone network.

BACKGROUND

Modern society offers people many opportunities and in fact places many demands on people to communicate with each other, often over great distances. One of the most common forms of communication involves conversational speech communicated between two or more parties through a telephone network. Today, such telephone communication is virtually ubiquitous throughout the modern world. A person can simply take a telephone off-hook at one location, dial a destination telephone number, and if someone answers the called telephone, the caller can converse with the other party anywhere in the world.

The communication of speech over the telephone network depends on both parties having good auditory abilities, to speak and hear each other. Persons with hearing and/or speech impairments often can not utilize voice-grade telecommunications services. For many years, these problems barred hearing or speech impaired individuals from communicating via the telephone network.

Data devices transmitting messages in the audio range carried by the telephone network were developed to allow such individuals to communicate through the network. The most common device for this purpose, a telecommunication device for the deaf "TDD" or similar device, typically appears as a simple computer or teletype (TTY) terminal. The TDD or TTY utilizes Baudot code to transmit and receive low speed character data. Typically, one user keys in conversational information on one TDD, which sends character data through the telephone network. Another user's TDD receives and displays the information. These TDD or TTY devices allow individuals having hearing or speech impairments to send and receive communications over any media that can transport the low-speed Baudot code. Many people with speech or hearing impairments and people they communicate with have used TDDs for some years now and have become quite accustomed to use of such devices in their everyday lives.

The Baudot code used by TDDs transmits characters represented by five binary information bits, which means that the character set is limited to 32 characters. To convey more characters, one character is designate "LTRs" indicating that subsequent characters represent letters, and another character is designated "FIGs" indicating that subsequent characters represent numbers.

The TDD or TTY device originally was designed for communication over analog telephone lines. Such a device sends the ones (1s) and zeros (0s) representing the five-bit binary Baudot character codes as separate audio tones, commonly referred to as "MARK" and "SPACE" tones in a form of frequency shift key (FSK) modulation. The tone frequencies (1400 Hz and 1800 Hz) originally were selected to enable accurate transport thereof through the telephone network. The telephone network itself is optimized to carry a limited portion of the audio spectrum, which normally contains the majority of audible information for human speech, typically in a range of approximately 300–4000 Hz. As such, the data communication devices commonly used by speech or hearing impaired individuals typically send and receive information in the form of FSK MARK and SPACE tones within the narrow audio bandwidth of the analog telephone service.

Use of a TDD/TTY data device enables the hearing impaired to communicate from any location having an analog telephone line to any other location having an analog line connection to a compatible device. As the telephone network has grown, this TDD service based on a telephone line connection has enabled people to use the TDD from almost any fixed location in the world. The main limitation has been that the user must communicate with someone having a compatible device and line connection. People who routinely communicate with hearing or speech impaired individuals have obtained compatible data devices. Many emergency services (e.g. E911), telephone companies, other businesses and government agencies also have installed compatible equipment to allow the impaired individuals to use their TDDs/TTY to communicate with operators/agents or even to interface with automated attendant systems for various purposes.

Modern society, however, also is becoming increasingly mobile. Many new communications services have emerged, to allow people to communicate freely as they roam, without the need for a fixed network connection. As the services have evolved, however, they have created new problems of access for persons with speech or hearing impediments.

To enable communications for people on the go, a number of wireless mobile services have evolved and grown exponentially. Analog cellular telephone service is now quite common throughout much of the developed world and continues to serve many customers. In recent years, a number of digital wireless communications technologies have begun to compete with and gradually replace the analog wireless service. All of these services enable a customer to make and receive wireless, voice-grade telephone calls from virtually any point in the carrier's service area. With roaming agreements, customer may obtain the mobile service from almost anywhere in a country or continent.

The digital versions of the mobile services offer a number of advantages over the older analog technology, most notably improved performance, much greater security/privacy, alternate communication of data, and easier implementation of new enhanced service features. In view of the advantages, the trend in the industry is to migrate over from the old analog wireless service to the newer digital wireless services.

As noted, the TDDs send and receive analog tone signals to carry the typed textual information. This technique is quite effective over the voice-grade landline telephone network. Users with TDDs and similar TTY devices also have had success communicating over analog cellular telephone networks. However, more modern digital wireless networks do not accurately transport the tone signals. The digitizing and compressing of the audio information and the associated noise reduction processing necessary in a digital wireless network badly distort the FSK MARK and SPACE tone signals used by TDD/TDY devices. This prevents persons wanting to continue to use their TDDs or TTYs from using the more modern digital wireless telephone systems, obtaining the benefits thereof or accessing many of the more modern service features available through the new digital mobile telephone networks.

Today there are many more modern data devices available that provide faster data communications than the TDDs or TTYs. Personal computers (PCs), in particular, offer fast textual data processing and communication in combination with multimedia capabilities. Most digital wireless stations and wireless communication networks support data communication, for example to and from laptop PCs. These communications carry the data over the air interface as digital data, without analog modulation or the need to pass analog signals back and forth through the noise reduction and vocoder circuitry. Such data devices and wireless communications provide far superior communications and increased mobility, and one solution for current users of TDD/TTYs might be to upgrade to these more modern data devices and communication technologies.

However, many people who have used the TDDs or the like for a substantial time are very reluctant to upgrade to the newer data devices. They are familiar with the TDDs and the conversation-like textual communication that those devices provide. They may be uncomfortable with the more complex operations of PCs. Also, anyone communicating with a person with an impairment needs to have a compatible device. Many already have TDD or TTY compatible equipment. An impaired user seeking to upgrade to newer types of data devices would incur the costs of the upgrade and force many people who regularly communicate with the user to upgrade to insure continued compatibility.

Also, for persons with certain impairments, TDD/TTY communication offers a "talk-over" feature that they want to maintain. Many individuals with hearing impairments can speak sufficiently clearly to talk over the telephone, but they can not hear the speech of the other party. A person with a speech impairment often can still hear normal speech. Many modern TDD/TTY devices support communication of voice blended with the MARK and SPACE tones of the TDD/TTY communications. For example, a hearing impaired individual might use a TDD to receive and display text communications from a caller but choose to speak in response. The speech signals are transmitted through the telephone network to the other party who hears the speech in the normal manner. Similarly, a person with a speech impairment needs to send data but can hear spoken responses from a distant party. Many of the newer data communication techniques do not support this combination of voice and data communication for the hearing impaired, and this further discourages replacement of the older TDD/TTY equipment.

It is imperative that all persons have equal access to modern communication services, including persons having hearing or speech impairments. This need for access extends to wireless mobile communications and to the more modern digital networks for such wireless communications. A need therefore exists for a technique to effectively communicate the data signals of the common data devices used by hearing or speech impaired persons, typically TDD or TTY devices, through digital wireless telecommunications networks. It has been suggested that such communications through the digital wireless networks should achieve an error rate of 1% or less, as currently possible through analog networks. There is a more specific need to enable communication of TDD/TTY information together with speech information, through such networks.

DISCLOSURE OF THE INVENTION

The invention addresses the above stated needs by providing effective techniques for converting the tone signals of the data devices to data signals compatible with the air interface of the digital wireless communication network. Over the air-link, the mobile units and base stations communicate the TDD or TTY type information as data messages, without coding of an analog signal in digital form. These data messages, representing the bits of the data, are inserted into the stream with any other information for the particular subscriber, for example, into the stream with any vocoded audio information.

To the person having a TDD or similar device, the digital wireless communication network appears entirely transparent and provides a service virtually identical to an older style analog connection. The protocol conversion bypasses the noise reduction and vocoder circuitry, eliminating the problems of encoding the analog audio tone signals. The multiplexing of the data words with the vocoded audio information allows a person to selectively use both the TDD/TTY data communication and speech communication in one session. The data device for the hearing or speech impaired user operates exactly as it always has and provides the user all of its existing service features. The user, however, may now connect to and take full advantage of the newer digital mobile communication network.

The present invention encompasses methods of providing the inventive access as well as equipment for such access, such as handsets, interfaces, mobile switching centers and wireless networks incorporating the equipment for the necessary protocol conversions.

Certain aspects of the invention relate to methods of providing digital mobile communications for an impaired user. A first such method involves providing digital wireless communication of vocoded audio information between a mobile station and a base station and relaying the audio information over a landline telephone network. At the mobile station, data signals are converted between a tone signal data format, used by a data device for the impaired user, and data messages in a format compatible with digital communication between the mobile station and the base station. The inventive method entails transporting the data messages between the mobile station and the base station together with the vocoded audio information. The mobile switching center provides a conversion between the data messages and tone signal data, in the format for the data device and in a form compatible with transport through the telephone network. The tone signal data is relayed between the mobile switching center and the landline telephone network, together with any audio information.

The communication method may provide digital transport of the data for the impaired user in the forward direction from the network and the mobile switching center toward a terminal coupled to the wireless mobile station. Alternatively, the method may provide transport of the data in the reverse direction, from a terminal coupled to coupled a mobile station through the mobile switching center and the network. Of course, the method also may facilitate two-way communication.

Thus, another method aspect of the invention relates to the processing of the data communication for the impaired user in the forward direction. This method entails receiving analog audio tone signals signifying input data, from a data communication device for the impaired user, and carrying representations of the analog audio tone signals through a telephone network to a digital wireless communication network. In a typical implementation, a telephone network digitizes all audio information and delivers the digital information to the mobile switching center. Any tones are contained in the digital data, for example in pulse code modulated (PCM) form. The digital wireless communication network generates representative data messages in digital form, in response to the representations of the analog audio tone signals. The digital wireless communication network transmits the representative data messages over an air-link to a mobile wireless station. Representative data messages received through the mobile wireless station are converted into corresponding analog audio tone signals, which are supplied to another data communication device for an impaired user coupled to the mobile wireless station.

Another method aspect of the invention relates to the processing of the data communication for the impaired user in the reverse direction. This method entails receiving analog audio tone signals representing input data, from a data communication device for the impaired user. Representative data messages in digital form are generated in response to the analog audio tone signals and transmitted from a mobile wireless station over an air-link to a base station. This method also involves converting representative data messages received through the base station into corresponding signals representing the audio tone signals in a format compatible with a landline telephone network, e.g. as PCM data representing the tone signals. The landline telephone network carries the corresponding signals representing the audio tone signals to another data communication device for an impaired user, which receives and processes the analog audio tone signals.

Other aspects of the invention relate to equipment for implementing the wireless communications for the impaired user, such as a digital wireless telephone network, a mobile switching center for use in such a network and a handset or interface to a handset specifically adapted to couple to the user's device and provide the appropriate conversions.

For examples a mobile user's apparatus might include a vocoder, a digital transceiver, a tone detector and a processor. The vocoder digitally encodes analog audio signals to form vocoded speech samples and decodes vocoded speech samples into analog audio signals. The digital transceiver provides two-way wireless communication of vocoded speech samples to and from the vocoder. The tone detector senses analog tones representing data from the data device for an impaired user. The processor generates digital data messages corresponding to the sensed analog tones. The processor supplies the data messages to the digital transceiver, for over-the-air transmission with vocoded speech samples from the vocoder.

The elements of this apparatus for the mobile user may be incorporated into a wireless mobile station. Alternatively, the wireless mobile station may include the vocoder and transceiver, and a separate interface connected to the station contains the tone detector and the processor.

The preferred embodiment of the user's apparatus also includes elements for receiving data for the impaired user. Specifically, the apparatus further comprises an analog tone generator, coupled to the processor, for generating analog tones representing data for the data device for the impaired user. The processor instructs the tone generator to generate the analog tones upon receipt of digital data messages corresponding to analog tones through the transceiver.

The mobile switching center used with the invention includes a digital switch for establishing selective connections to circuits going to digital wireless base stations. A demultiplexer, coupled to the digital switch receives a user's digital data stream, received from a mobile unit through one of the wireless base stations. From this digital stream, the demultiplexer separates digital messages representing predetermined tone signals for the data device for the impaired user from vocoded speech samples. The switching center also includes a vocoder coupled to the demultiplexer. The vocoder digitally decodes the speech samples into representations of analog audio signals, e.g. in PCM form. A decoder, coupled to the demultiplexer, decodes the digital messages to identify the predetermined tones. The mobile switching center includes a generator that produces representations of the predetermined tones in response to instructions from the decoder. A combiner combines the representations of analog audio signals and the representations of the predetermined tones into a signal stream for transmission over a telephone network.

In the preferred embodiment, the switching center also processes signals bound for the impaired mobile user. Specifically, the switching center further comprises a tone detector and an encoder. The tone detector recognizes representations of predetermined tone signals for the data device for the impaired user, typically in signals received through the telephone network. The encoder generates digital data messages corresponding to the detected tone signals, for transmission through the base station and the air-link to the user's wireless mobile station.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The invention involves protocol conversions between the standard tone signals used by TDD/TTY devices or the like and data messages in a standard data format utilized within the air-link of a digital wireless telephone system.

In either direction, one or more tones generated by the data device are detected. Upon detection, a protocol converter generates a data message signifying one or more of the bits represented by the tone(s) in a format used by the air-link protocol. The converter supplies the data message to the appropriate digital radio transceiver. The transceiver inserts the message into the data stream with any other information for the pertinent subscriber, such as vocoded audio information. The transceiver sends the combined data stream over the air-link. Another unit receiving the transmission reverses the process, to recover the messages and generate corresponding tone signals. The tone signals are mixed in with any received audio information. In this manner, a party using a TDD or the like may send and/or receive data and send and receive related conversational speech information, in essentially the same manner as "talkover" communications conducted via the landline telephone network.

One set of the necessary conversions is performed in a mobile apparatus, either in the mobile station itself or in a mobile station combined with an interface to the data device. On mobile-to-mobile calls, a second similar apparatus performs the inventive conversions. Many calls, however, involve transport over the landline telephone network. On such calls, an element of the digital wireless communication network provides conversions between the data message format and tone representations compatible with the landline network.

Figure 1:
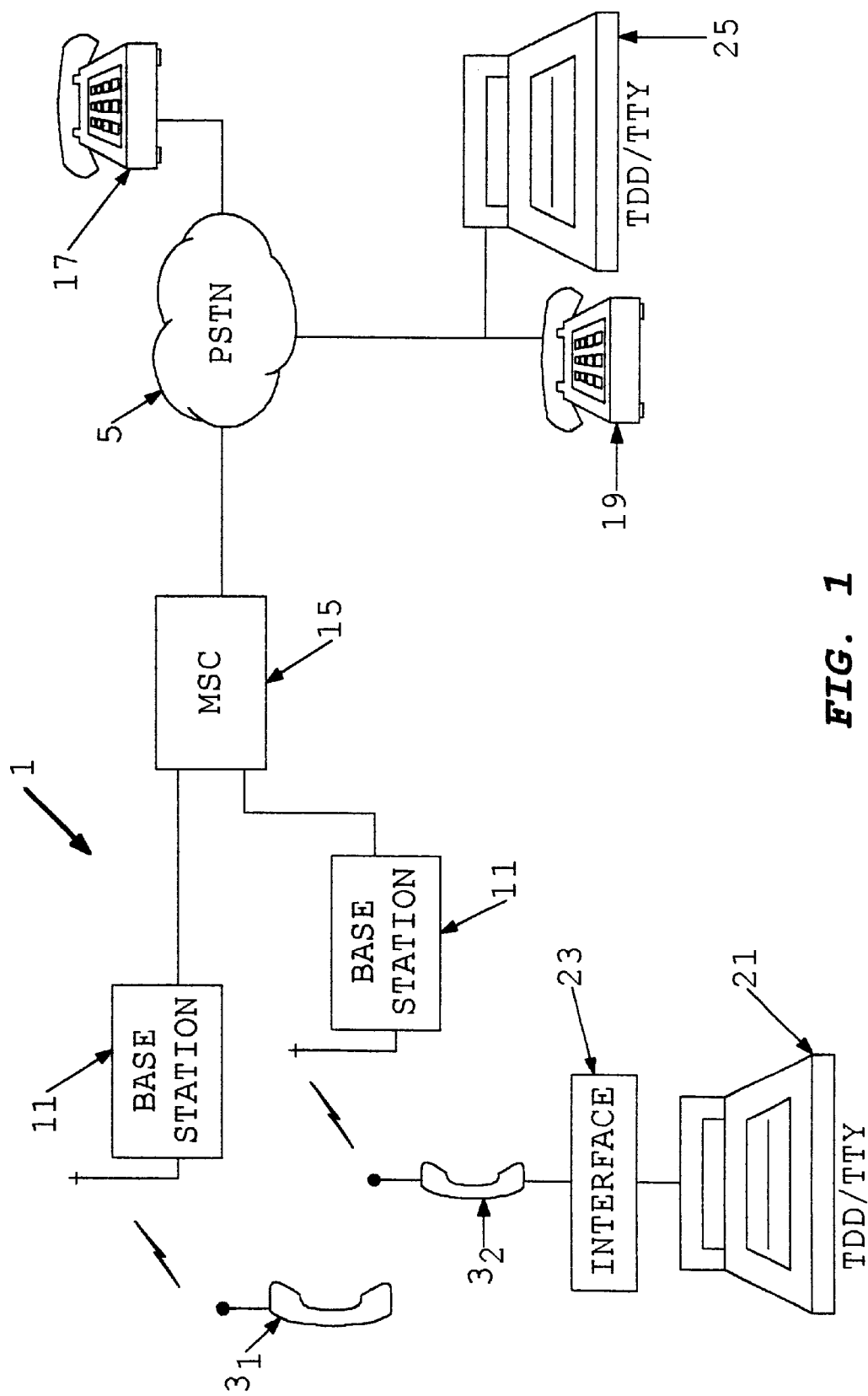
FIG. 1 is a simplified block diagram of a telephone network, with digital wireless service, adapted to provide mobile TDD/TTY access via the digital wireless communications, in accord with the present invention.

FIG. 1 depicts a system for providing voice telephone communications as well as TDD or similar data communications to and from persons with impairments to their speech or hearing or the like, in accord with the invention. As shown, a digital wireless telephone network 1 provides cellular or personal communications service (PCS) type services to mobile stations depicted by way of example as mobile handsets 3. The network 1 enables users of the mobile stations 3 to initiate and receive telephone calls to each other as well as to telephones accessible through the public switched telephone network (PSTN) 5.

FIG. 1 shows a simplified version of a common digital wireless telephone network 1. The network 1 includes a number of digital wireless base stations 11, typically providing cellular radio coverage over the geographic area serviced by the network 1. The base stations 11 send and receive digital radio signals communicated to and from compatible mobile stations 3. The base stations 11 also communicate over trunk circuits to a mobile switching center (MSC) 15. The MSC 15 controls the operations of the network 1 and provides selective switched connections. The switched connections through the MSC 15 may connect base stations together, for example to enable calls between two mobile units $3_1$, $3_2$. The switched connections through the MSC 15 also provide selected call connections to the PSTN 5, for example to allow a user of mobile handset $3_1$ to make a call to or receive a call from one of the landline telephone stations shown for example at 17 and 19.

The mobile stations 3, the base stations 11, and the MSC 15 implement a standard digital air-link interface. Digital wireless equipment is available today to support any one of several common interface standards, including time division multiple access (TDMA) and the Global System for Mobile communications (GSM). The preferred embodiment of the digital wireless telephone network 1 supports the code division multiple access (CDMA) standard.

With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system.

In accord with the concepts of the invention, the CDMA or other type of digital wireless network 1 also supports TDD or similar data communications typically used by the hearing or speech impaired. In the illustrated example, a person with an impairment might use a TDD/TTY device 21. At home or work, this person could connect the device to a telephone line (not shown), in the normal manner. However, when away from home and office, the user would connect the TDD/TTY device 21 to a handset $3_2$. The connection to the handset could be direct, as discussed later with respect to FIG. 3. In the illustrated example, the user connects the TDD/TTY device 21 to an interface 23, and the interface in turn connects to the mobile handset $3_2$.

The connection through the interface 23 and the handset $3_2$ enables the user to communicate data signals through the wireless network 1. These communications could be with users of other handsets, but in the illustrated example, the communications are with a user of another TDD/TTY device 25 coupled to the line of telephone station 19. The wireless digital network 1 therefore provides a call connection to the PSTN 5, and the PSTN 5 provides a switched call connection to the line to the station 19 and the TDD/TTY 25.

The connection of the TDD/TTY 21 to the interface 23 could be acoustic, but preferably, this is an electrical connection. To the TDD/TTY device 21, the interface 23 preferably provides an appearance through the connection emulating a standard analog telephone line connection. The interface 23 preferably connects electrically to a standard data port or the like on the handset $3_2$.

The interface 23 performs two-way protocol conversions between the tone signals used by the TDD/TTY device 23 and data messages compatible with digital communications between the handset $3_2$ and one of the base stations 11 of the digital wireless communication network 1. The handset sends and receives the data messages together with any vocoded audio communication sent and received between the handset and the base station 11.

On a call to a TDD/TTY coupled to another mobile station 3, the handset and interface provide essentially the same conversions to allow the two-way communications of data and/or audio information. On calls involving transport through the PSTN 5, however, the MSC 15 performs the conversions between data messages and the signal format used by the PSTN 15.

Equipment within the MSC 15 performs essentially a mirror image of the protocol conversion operations of the interface 23 and the handset $3_2$. Specifically, the MSC detects and extracts any data messages representing TDD/TTY tones from other information in the reverse direction transmission signals from the handset $3_2$. In response to the data messages, the MSC generates PSTN compatible signals representing the originally detected tone signals from the TDD/TTY. The MSC could generate analog FSK signals for the MARK and SPACE tones, but preferably the MSC generates pulse code modulated signals corresponding to the actual tones. The MSC mixes the generated tone signals with any other information from the handset, now also in PSTN compatible form, and sends the mixed signals to the PSTN 5 for communication to the telephone 19 and/or the TDD/TTY 25.

In the opposite direction, the MSC 15 receives signals from the telephone 19 and/or the TDD/TTY 25. The MSC equipment detects and extracts any MARK and SPACE tones and generates corresponding digital data messages. The MSC also vocodes any audio information from the telephone station 19. The MSC combines the vocoded audio information and the data messages representing the tones and supplies the data stream to the base station 11 for transmission to the handset $3_2$, interface 23 and TDD/TTY 21.

Figure 2:
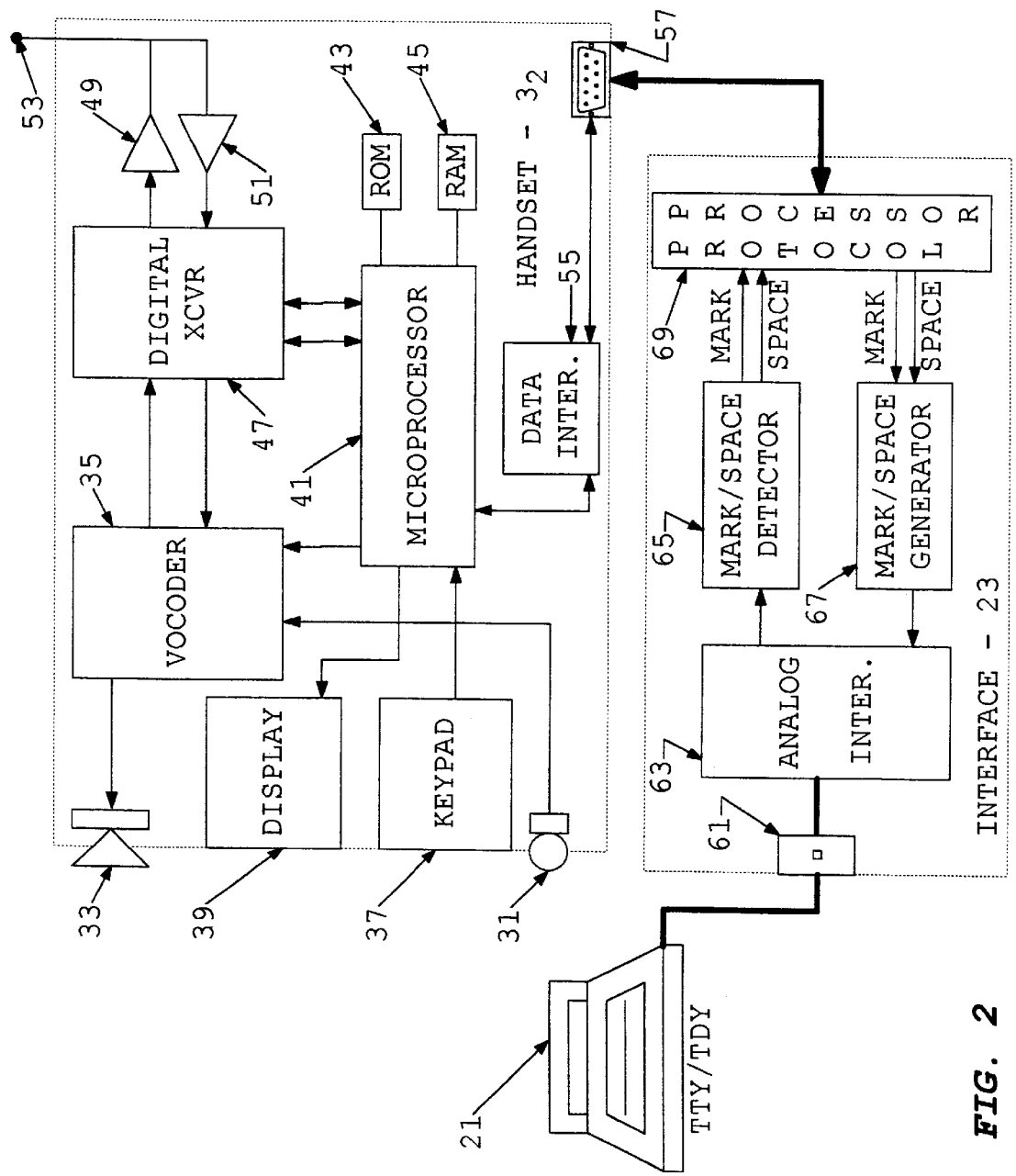
FIG. 2 is a functional block diagram illustrating one implementation of a digital mobile telephone and associated interface to a TDD/TTY, for use in the network of FIG. 1.

FIG. 2 shows a first implementation of the handset $3_2$ and the interface 23. The handset is essentially a standard digital service type wireless telephone, as commonly used in digital cellular or PCS type networks. The handset $3_2$ includes a microphone 21 for detecting audio frequency sonic energy and generating corresponding analog electrical signals. The handset $3_2$ also includes a speaker 33 for generating audio frequency sonic energy in response to analog electrical signals. The microphone 31 and speaker 33 connect to voice coding and decoding circuitry (vocoder) 35, which provides two-way conversion between analog audio signals representing speech or other audio and digital samples at a compressed bit rate compatible with the wireless telephone network communications. The digital samples of audio information are sometimes referred to as "vocoded speech samples." The vocoded speech samples output from the vocoder take the form of words or frames of binary data. Each frame or word includes a header, one function of which is to indicate that the binary data comprises vocoded speech samples.

The digital handset $3_2$ also incorporates a keypad 37, to allow the user to input digits. The keypad typically takes the form of a ten-digit (0–9) keypad with two additional keys (*, #). For the cellular services, the keypad usually includes some extra keys, such as a "SEND" or "TALK" key and an "END" key as well as some special function keys to control certain text and menu functions. The handset $3_2$ also includes a display 39, for displaying dialed numbers, menus, speed dial lists, incoming caller identifications, and the like.

A microprocessor 41 controls all operations of the handset $3_2$. The microprocessor 41 is a programmable device. Programming for the microprocessor 41 resides in a read only memory (ROM) 43, flash EEPROM (not shown) or the like. The microprocessor 41 also connects to a random access memory (RAM) 45, which provides temporary working storage of data used by the microprocessor.

The keypad 37 supplies user input information to the microprocessor 41, and the microprocessor provides digital data signals to cause the display to show appropriate information to the user. Under control of the microprocessor 41, the display 39 shows textual information, such as dialed numbers and name and number information regarding stored speed dialing lists. The display 39 also may have certain specialized indicators, such as a message-waiting indicator.

For digital wireless communications, the handset $3_2$ includes a digital transceiver (XCVR) 47. The invention encompasses embodiments utilizing any digital transceivers that conform current or future developed digital wireless communication standards. For example, the transceiver could be a TDMA or GSM unit, designed for cellular or PCS operation. In the preferred embodiments, the transceiver is a CDMA transceiver. The transceiver 47 connects through RF send and receive amplifiers 49, 51 to an antenna 53. The transceiver 47 provides two-way wireless communication of information, such as vocoded speech samples and digital message information. The transceiver 47 also provides two-way wireless communication of signaling data, for certain network functions such as registration and for call set-up.

Many digital handsets include data connections, to enable connection to an external data device, to enable the external device to send and receive data through the digital wireless link. In the illustrated example, the handset $3_2$ includes a two-way data interface 55 connected to the microprocessor 41. The data interface 55 is coupled to a standard data connector 57, on the exterior housing of the handset. The connector 57 and the data interface 55 allow an external device to supply data to and receive data from the microprocessor 41. The microprocessor 41 and the transceiver 47, in turn, send and receive the data for the external device over the air-link. In accord with this embodiment of the invention, the data interface and connector 57 provide a standard data link for connection of the interface 23 to the microprocessor 41 within the handset $3_2$.

FIG. 2 also provides a functional block diagram illustration of the major elements of the interface 23. As shown, the interface 23 includes a connector 61 for coupling to the TDD/TTY device 21. As noted, the interface could use an acoustic coupler or other analog interface, but preferably, the connector is a standard telephone line type electrical connector. An analog interface 63 is coupled to the port connector 61. The interface 63 provides an analog two-wire line appearance to the TDD/TTY 21 through the connector 61.

An output of the interface 63 connects analog signals from the TDD/TTY 21 to a MARK/SPACE detector 65. The detector 65 includes appropriate filter and logic circuitry to sense the individual FSK modulation tone signals and provide indications of the detected tones. An input of the interface 53 connects analog signals to the TDD/TTY 21 from a MARK/SPACE generator 67. The MARK/SPACE generator 67 responds to instructions to generate the FSK modulation tones representing the bits of Baudot coded characters.

The interface 69 includes a protocol processor 69. The protocol processor 69 connects to the data port 57 of the handset $3_2$, and it connects to the MARK/SPACE detector 65 and the MARK/SPACE generator 67 within the interface 23. The protocol processor 69 responds to signals from the detector 69 indicating detection of the MARK and SPACE tones by generating data messages. Preferably, one type of data message is a word indicating a MARK tone and another type of data message is a word indicating a SPACE tone. Each data word includes an indicator in the header, to at least distinguish the word from frames or words containing vocoded speech samples. The indicator may be the same as or distinct from that used for messages representing keyed digit inputs.

The protocol processor 69 supplies the resulting data words through the connector 57 to the handset $3_2$ for digital transmission in sequence, corresponding to the sequence of detection of the tones. The protocol processor 69 also receives similar digital words from the handset $3_2$ via the port 57. In response, the processor 69 instructs the generator 67 to generate MARK and SPACE tones in sequence matching the sequence of messages received from the handset $3_2$. The processor 69 together with the detector 65 and the generator 67 provide a two-way conversion between the FSK tone signals and digital data messages.

Essentially, the protocol processor 69, the microprocessor 41 and the digital transceiver 47 process the TDD/TTY information in a manner analogous to key operations, for example as used for the input of digits via the keypad 37. In a standard handset, once a call is set-up, if the user activates a key on the keypad 37, the microprocessor 41 detects the key input and generates a data message in a standard format corresponding to the digit, in the standard digital wireless protocol. Part of the header identifies each such message as relating to key input data. The microprocessor 41 supplies the message corresponding to the input digit to the transceiver 47; the transceiver inserts the digit message into the data stream; and the transceiver modulates and transmits the data stream. In the reverse direction, the transceiver 47 detects digit messages in the received signals based on the header information, extracts those messages and supplies them to the microprocessor 41. The microprocessor identifies the appropriate digit from each message and supplies an instruction to the vocoder 35 to generate a tone signal corresponding to the digit for output to the user via the speaker 33. The user hears a DTMF tone for the digit identified in the message.

In accord with the invention, the processor 69 supplies the data messages representing the FSK modulation tones to the handset and receives similar data messages from the handset $3_2$. The port connector 57 and the data interface 55 provide two-way communication of the data messages between the microprocessor 41 and the protocol processor 69. The microprocessor 41 controls the digital transceiver 47. In particular, the microprocessor 41 causes the digital transceiver 47 to insert digital messages from the interface 23 into the data stream for RF transmission to the base station 11 and to extract any received data messages relating to TDD/TTY communications, in a manner similar to that for key inputs and DTMF digit tones.

A handset 3 and the wireless network 1 processes the data messages relating to digit key inputs differently from words or frames of vocoded speech sample data. Preferably the handset $3_2$ and the wireless network, process the messages relating to the FSK tones in a manner similar to that for the digit key inputs. Specifically, a handset 3 transmits the vocoded speech information only once. If a word or frame does not get through to the base station, for example because of interference over the air link, there is no retransmission. The handset simply continues transmitting subsequent speech samples. For the digit inputs and the FSK tone signal messages, however, the handset $3_2$ and the wireless network 1 implement a process to insure accurate message transmissions. For example, if the handset is sending the message, the base station sends an acknowledgement upon successful receipt of the message. If the handset does not receive the acknowledgement within a set time interval, the handset retransmits the message. The wireless network implements a similar procedure to accurately send data messages to the handset.

Most handoff operations in a digital wireless network use a relatively soft handoff procedure, where the mobile station communicates with two or more base stations for some portion of the handoff. Even in a hard handoff situation, the mobile station and the base station buffer data for transmission after completion of the handoff. There is no actual interruption of the communications. In the older analog systems, the handoff process involves an actual interruption of signal, typically for about half a second. The elimination of signal interruption during handoff reduces errors encountered by the TDD/TTY user operating through the wireless network. Also, the requirement for acknowledgement and retransmission of any unacknowledged data messages virtually eliminates loss of such messages, due to handoff or disruptive effects on the air link. Consequently, the data service for the TDD/TTY through the digital network provides substantially reduced average error rates.

Figure 3:
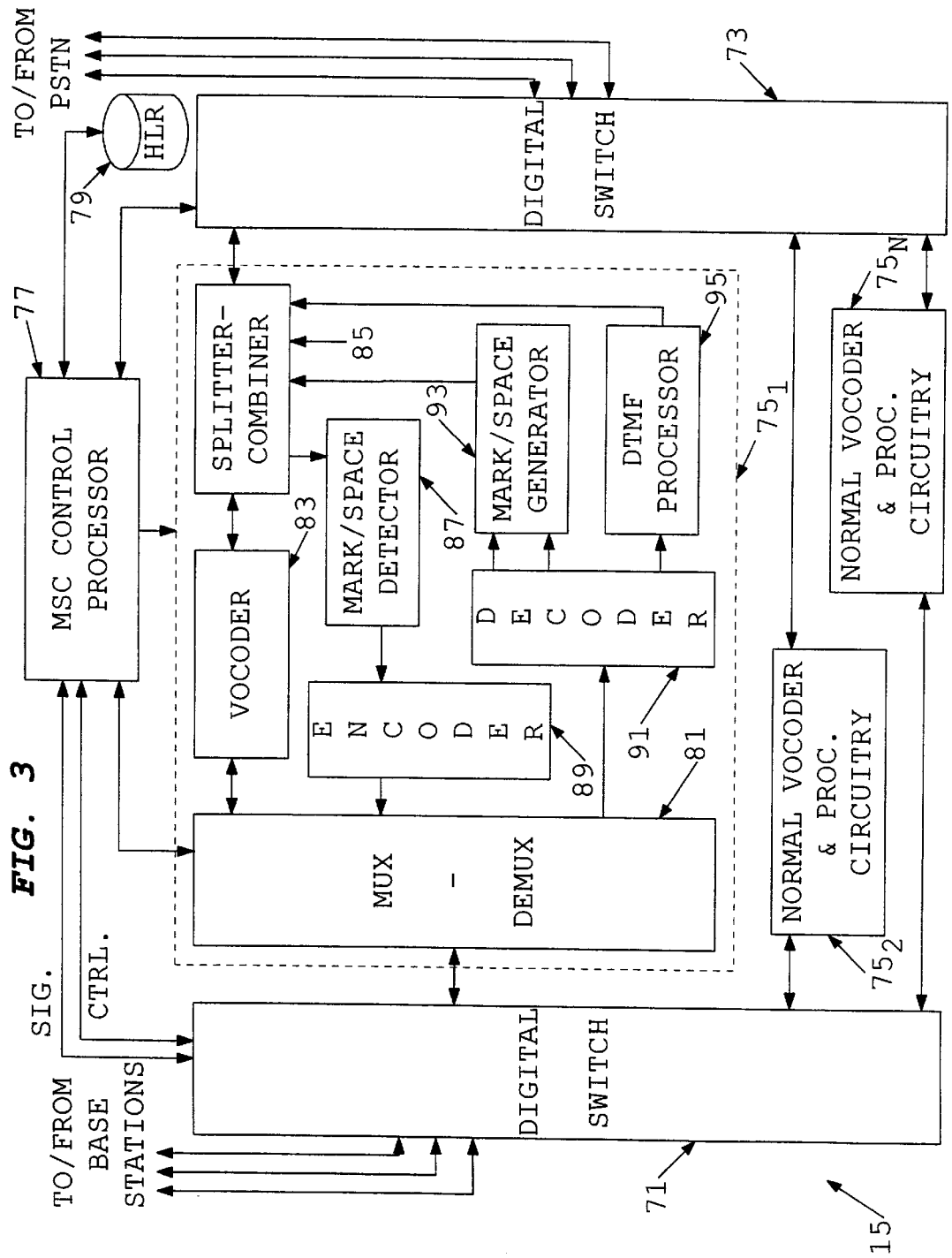
FIG. 3 is a functional block diagram of a mobile switching center (MSC) for use in the network of FIG. 1 and showing the functional elements for enabling the inventive TDD/TTY access.

FIG. 3 depicts the significant functional elements of the mobile switching center (MSC) 15, as they relate to the inventive TDD/TTY access. As shown, the MSC includes a first digital switch 71. The digital switch 71 provides selective connections to channels on the trunk circuits to and from the base stations 11. The digital signals connected through the switch 71 are in a form and at a compressed rate compatible with the RF communication standard used over the air-link between the base stations 11 and the mobile stations 3.

The MSC also includes a second digital switch 73 providing selective connections to channels on PSTN trunk circuits. The digital signals processed through the switch 73 typically are DSO type digital telephone signals at 64 kb/s, with audio information encoded in pulse code modulated (PCM) form. The digital switch 73 performs a synchronous time slot interchange type switching on the DSO channel signals, to provide selective call connections compatible with the PSTN 15.

The digital switches 71, 73 are shown as separate switches for convenience of illustration and discussion. In practice, there may be a single switch fabric performing both switch functions.

As noted, the switch 71 processes the signals in a form compatible with the base stations 11, i.e. in the digital format conforming to the particular wireless communication standard. By contrast, the digital switch 73 processes signals in the DSO format compatible with the PSTN 15. The MSC therefore includes vocoder and processing circuits 75, coupled between ports of the two switches 71, 73, for conversion of the signals between the two formats. FIG. 3 depicts three such circuits 75 as representative examples. In accord with the invention, the circuit 75, includes components to perform the two-way protocol conversion for the TDD communications, as well as components for normal audio signal and digit signal processing. The other processing circuits, $75_2$ to $75_N$ are normal processing circuits, which perform normal vocoder functions and normal processing of signals representing digit inputs from the handsets of the mobile stations.

A control processor 77 connects to the digital switches 71, 73 and to the vocoder and associated processing circuits 75. The processor 77 controls overall operations of the MSC 15. For example, the processor 77 accesses information in a home location register (HLR) database 79, to validate mobile stations 3 during registration. The control processor 77 controls switched connections through the digital switch 71, to couple base station links together to effect call connections between two handsets, and possibly between two associated TDD/TTY devices. The control processor 77 also controls switched connections through the switches 71, 73 and the processing circuits 75, to effect connections between mobile stations 3 and the PSTN 15.

In accord with the invention, one of the processing circuits 75 includes additional elements to perform the protocol conversion for the TDD/TTY communications. FIG. 3 shows an example of one such circuit $75_1$.

The processing circuit $75_1$ includes a multiplexer/demultiplexer (MUX-DEMUX) coupled to digital switch 71 through an appropriate channel for a single call communication to and from one of the handsets 3.

The MUX-DEMUX receives the digital data stream sent over the air from the handset, as received through one of the base stations 11 and the switch 71. The DEMUX function of the device 81 separates digital data words from any vocoded audio information. The MUX-DEMUX supplies any vocoded audio information to a vocoder 83. The vocoder converts the audio information to the DSO format for use by the PSTN 15 and supplies the resultant information through a splitter/combiner 85 to the digital switch 73, which in turn sends the audio information through the PSTN to the destination in the normal manner.

The DEMUX function of the circuit 81 supplies various digital data messages from the handset to a decoder 91. The data messages include messages relating to key inputs and messages relating to the tone signals for TDD/TTY communication. The decoder recognizes the various data messages and provides appropriate instructions to a MARK/SPACE generator 93 and a DTMF processor 95.

More specifically, the MUX-DEMUX 81 supplies the data messages relating to the tone signals for TDD/TTY communication to the decoder 91. The decoder 91, in turn, identifies the data messages corresponding to the individual MARK and SPACE tones and supplies an appropriate control signal for each tone to the MARK/SPACE generator 93. In response, the MARK/SPACE generator 93 generates FSK modulation tone signals, albeit in a form compatible with transmission over a DSO through the switch 73 and the PSTN 15, e.g. as PCM encoded tones.

The decoder 91 receives the data messages representing the Baudot encoded characters from the TDD/TTY 21 and generates the instructions for the generator 93. As a result, the generator 93 generates the PCM representations of the MARK and SPACE tone signals in precisely the order for the Baudot coded information as originally output by the TDD/TTY.

The MUX-DEMUX also supplies any data messages relating to key inputs to the decoder 91. The decoder 91 identifies the particular key input from each such data message and instructs the processor 95 to generate corresponding DTMF signals. The DTMF signals from the processor 95 take a form compatible with transmission over a DSO through the switch 73 and the PSTN 15, e.g. PCM encoded audio tones. In this manner, the processor 95 outputs DTMF tone pairs associated with digit keys of the keypad 37 of the handset 3, as actuated by the user after set-up of the call connection through the MSC 15. Obviously, the functions of the MARK/SPACE generator and the DTMF processor may be combined into one unit.

The MARK/SPACE generator 93 and the DTMF processor 95 output the various PCM encoded tone signals to upstream inputs of the splitter/combiner 85. In this direction, the splitter/combiner 85 performs a mixing function, to combine the PCM tone signals with the PCM audio information from the vocoder 83. The splitter/combiner 85 sends the combined PCM information over the DSO channel through the digital switch 73 and the PSTN 15.

For information directed to the handset from the PSTN, the digital switch couples the information in DSO form to the splitter/combiner 85. In this direction, the splitter/combiner performs a selective filter and demultiplexing function. The splitter/combiner 85 supplies normal PCM audio information to the vocoder 83, for conversion to the format used by the wireless communications from the base station 11 to the handset 3. The splitter/combiner 85 filters and separates out any PCM data representing tone signals, so as to supply the tone signals to a MARK/SPACE detector 87.

The detector 87 comprises a digital processor, for identifying the MARK and SPACE tones included within the PCM audio information. The detector provides identification to an encoder 89, of each of the FSK tones sensed in the stream received in the DSO channel from the digital switch 73. In response, the encoder 89 generates data messages. Preferably, one type of data message is a word indicating a MARK tone and another type of data message is a word indicating a SPACE tone, in the format compatible with the digital air interface. The encoder 89 supplies the resulting data words in sequence, representing the sequence of MARK and SPACE tones, to a downstream or forward channel input of the MUX-DEMUX 81.

In the forward direction, the MUX-DEMUX 81 combines the digital messages from the encoder 89 with the digitized and compressed audio information from the vocoder 83. The MUX-DEMUX 81 supplies the resulting data stream through the digital switch 71 to the channel assigned for the user on the circuit going to the base station 11. The base station 11 in turn modulates and transmits this data stream over the air to the handset 3.

Consider now the communications of TDD/TTY information through the elements depicted in FIGS. 1 to 3, in somewhat more detail.

The mobile user places a call by dialing on the TDD/TTY 21 or the wireless mobile station $3_2$, depending on the precise type of connection of the TDD/TTY to the telephone. The MSC 15 sets up the call connection through the switches 71, 73 and the PSTN 15, and the PSTN 15 rings the destination station 19. As part of this call set-up, the MSC control processor 77 causes the switches 71, 73 to route the call through the processing circuit 75, for example, upon recognition of a TDD/TTY service feature associated with the handset $3_2$ in its profile in the HLR database 79.

The wireless station $3_2$ and the interface 23 provide audible signaling information, such as Ring, Busy, and the like, to the TDD/TTY 21. The TDD/TTY 21 displays this information in the normal manner to indicate the status of the call in progress. This is a silent call until answered at the dialed destination, for example at the landline telephone station 19 and/or the TDD/TTY device 25. When the called party answers, the TDD/TTY 21 detects the answer, for example as an end of Ring-back tone, and displays an indication of this condition.

For communication in the reverse direction toward the base station 11 and the MSC 15, the user can now key in text data on the TDD/TTY 21. The TDD/TTY 21 generates MARK and SPACE signals for the individual bits of the Baudot coded characters. Baudot FSK uses modulation between 1400 Hz and 1800 Hz tones to send data at a rate of 45.5 Baud. The TDD/TTY 21 supplies those FSK tone signals over the connection to the interface 23. Within the unit 23, the analog interface supplies the signals to the detector 65, which senses the individual MARK and SPACE type FSK tones in the sequence received from the TDD/TTY device 21. The detector 65 indicates detection of each of these tone signals in sequence to the protocol processor 69. The processor 69 generates corresponding data messages and supplies those messages through the port 57 and the data interface 55 to the handset microprocessor 41.

The wireless mobile station $3_2$ and the interface 23 effectively provide an automatic switching or multiplexing between voice and data. When the TDD/TTY 21 is sending data, the handset $3_2$ sends the data. However, when the interface detects no data transmissions, the interface provides no data messages to the handset $3_2$, and the handset defaults to transmission of vocoded audio information.

If the handset microphone 33 detects audio information, such as speech from the user, the vocoder 35 inside the handset $3_2$ digitizes and compresses the audio signal and formats the vocoded samples for wireless transmission over the air-link. The vocoder normally supplies the digitized and compressed audio signals to the digital transceiver 47. However, the microprocessor 41 also supplies any digital messages relating to detected TDD/TTY transmissions to the digital transceiver 47. The data messages take precedence and may block vocoded audio transmission, but if there are no data transmissions at the time of detection of speech, the transceiver 47 sends the speech information. As such, the microprocessor 41 effectively instructs the transceiver 47 to combine any data messages from the interface 23 into a data stream together with at least portions of the digitized, compressed audio information from the vocoder 35. This multiplexing of the digital audio and the data messages enables reverse channel communication of data with any speech for persons having voice carry over abilities.

The transceiver 47 modulates and transmits the combined data stream over the air-link to the base station 11. The base station 11 receives and demodulates the transmission and supplies the combined data stream over a channel on the trunk circuit to the MSC 15.

At the MSC 15 (FIG. 3) the MUX-DEMUX 81 separates out the vocoded information and the TDD/TTY data messages, in a manner similar to the processing of digits input by actuation of the handset keypad from the speech signals. The vocoder 83 decodes the speech from the handset 3 into a form compatible with PSTN communication. The decoder 91 and generator 93 respond to the data messages representing the FSK tones by generating PSTN compatible signals corresponding to the original FSK tones. The combiner 85 mixes the speech and tone signals and supplies the resulting information through the switch 73 and an appropriate trunk circuit channel to the PSTN 5.

The speech and tone signals supplied to the PSTN could be analog signals. However, the modern PSTN typically carries 64 kb/s pulse code modulated (PCM) type audio information, so, preferably the MSC outputs both the decoded speech and the FSK tones in a 64 kb/s stream (DS0). The PSTN 5 transports the speech and tone signals from the handset $3_2$ and the TDD/TTY 21 in the normal manner to the location of the other party to the particular call, for example to the telephone 19 and the TDD/TTY 25, in essentially the normal manner. In particular, the end office of the PSTN 5 serving the line to the telephone 19 converts all PCM audio signals back to analog form for transport over the twisted wire pair.

In our example, the analog signal carries the mix of the speech signal from the handset $3_2$ together with the FSK MARK and SPACE tones from the TDD/TTY 21. To the TDD/TTY 25 and the telephone 19, the received signals appear exactly the same as if they came from an analog telephone and a TDD/TTY device connected to a plain old telephone service (POTS) analog line of the PSTN 5. The TDD/TTY 25 decodes the FSK signals to recover the binary data of the Baudot code, detects the characters in the Baudot code and provides an appropriate textual display. The called party can hear any audio communications through a speaker on the TDD/TTY 24 or the telephone station 19.

The communications from the location of the TDD/TTY 25 to the handset and TDD/TTY 21 go through an essentially similar communication process. The user at that location can send analog audio speech signals and FSK tone signals over the line from the TDD/TTY 25 to the end office of the PSTN 5, typically in a mixed analog audio signal. The end office typically converts those analog signals to 64 kb/s PCM, and the PSTN 5 transports the PCM signals to the MSC 15.

The splitter/combiner 85 supplies the PCM data for the FSK tone signals to the MARK/SPACE detector 87. The detector 87 senses each FSK tone and notifies the encoder 89. The encoder generates corresponding data messages, identifying the received tones. The encoder 89 supplies the data messages to the MUX-DEMUX 81. Any audio information arriving during intervals when the tones from the TDD/TTY 25 are silent is compressed by the vocoder 83, in the normal manner. The MUX-DEMUX 81 combines the data messages and the vocoded audio information into a data stream. The MUX-DEMUX 81 supplies the data stream through the switch 71 and trunk circuit, to the base station 11 serving the handset $3_2$.

The base station 11 modulates the data stream and transmits the modulated information over the air to the handset $3_2$. The handset receives and demodulates the transmitted RF signal. From the data stream, the handset circuitry recognizes the data messages and supplies those messages through the port to the interface 23.

In the interface 23, the protocol processor 69 recognizes each message representing a MARK or SPACE tone signal. In response to each such message, the protocol processor 69 instructs the generator 67 to output a corresponding analog tone signal. The analog interface 63 supplies the analog tone signals through the connector 61 to the TDD/TTY 21, which decodes and displays the textual data as keyed in at the sending TDD/TTY 25. At the same time, the vocoder 35 decodes any received audio information and outputs that information through the speaker 33 to the user.

In the above example, the user of the TDD/TTY 21 at the mobile station initiated the call. However, the communications are essentially similar if the landline TDD/TTY user initiates the call. The main differences relate only to the call set-up between the two TDD/TTY devices and the associated telephones. In such a case, the user of the TDD/TTY 25 dials the telephone number of the wireless mobile station $3_2$ on the telephone 19 or the TDD/TTY 25, in the normal manner. The PSTN routes the call to the MSC 15, and the MSC 15 initiates signaling through the serving base station 11 and the air-link to signal the handset $3_2$ of the incoming call. The handset $3_2$ may ring or vibrate to alert the user. Preferably, the handset and interface 23 provide tone signals to the TDD/TTY 21 emulating the ringing signal, to enable the TDD/TTY device to visually display the incoming call notice. To this point, there has been no Baudot communications, but once the called party answers, the interface 23 and handset $3_2$ provide two-way voice and TDD/TTY data communications exactly as in the earlier example.

Figure 4:
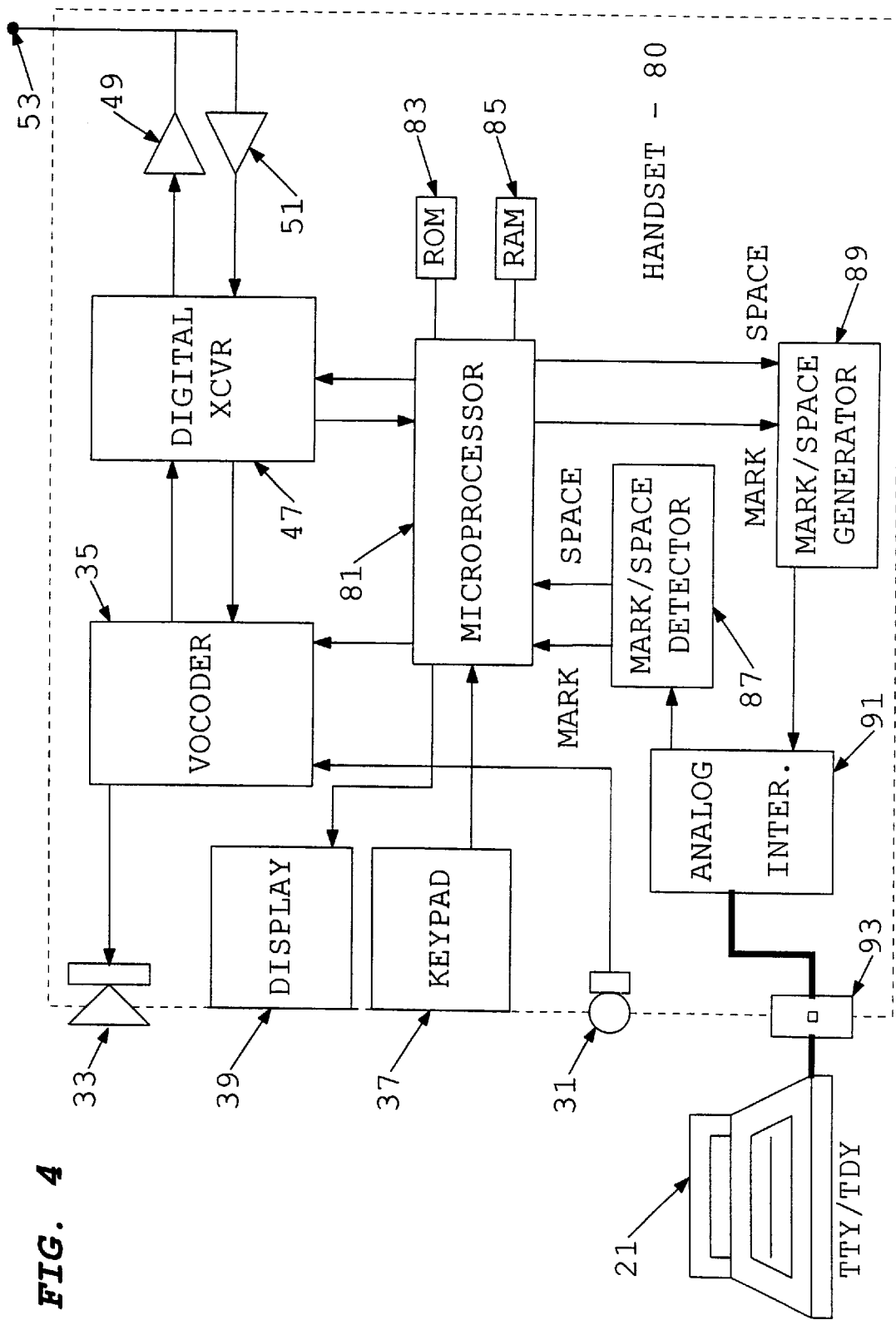
FIG. 4 is a functional block diagram illustrating another implementation of a digital mobile telephone, which incorporates elements for interfacing a TDD/TTY into that telephone.

FIG. 4 depicts an alternative embodiment of the mobile handset. The handset $3_2$ of FIG. 2 was essentially a standard mobile handset with a data port for connection of external devices, such as the interface 23 for coupling to the TDD/TTY. The handset 80 of FIG. 2 incorporates the elements for interfacing with the TDD/TTY.

The handset 80 includes the normal digital wireless telephone elements, as in the handset of FIG. 2, and corresponding reference numbers identify these elements. It is believed that the discussion of FIG. 2 should provide adequate understanding of these elements.

The microprocessor 81 controls the operations of the handset 80, however, the microprocessor 81 also performs the protocol processing functions. The handset includes a ROM 83 or similar program memory and a RAM 85 for temporary working data storage. The stored program causes the microprocessor 81 to control the digital wireless operation and to processes the TDD/TTY communications.

The microprocessor 81 connects to a MARK/SPACE detector 87 and a MARK/SPACE generator 89. The MARK/SPACE detector 87 and the MARK/SPACE generator 89 in turn connect to an analog interface 91. The interface 91 provides an analog two-wire line appearance to the TDD/TTY 21 through an appropriate electrical connector 93.

The interface 91, the MARK/SPACE detector 87 and the MARK/SPACE generator 89 may be essentially similar in structure and operation to corresponding elements in the interface 23. The MARK/SPACE detector 87 senses the FSK tone signals and identifies each detected tone in sequence to the microprocessor 81. The microprocessor 81 generates the corresponding sequence of data messages and causes the digital transceiver 47 to insert the data messages into the data stream with the vocoded speech samples, for RF transmission to the base station 11. In the forward direction, the transceiver 47 extracts any received data messages relating to TDD/TTY communications and supplies those messages to the microprocessor 81. The microprocessor 81 identifies the FSK tones that should correspond to the bits represented by the received data messages and instructs the MARK/SPACE generator 89 to sequentially generate the corresponding tones in analog signal form. The generator 89 outputs the FSK tone signals through the analog interface 91 to the TDD/TTY 21.

Those skilled in the art will recognize that the present invention admits of a number of modifications, within the spirit and scope of the inventive concepts. For example, the above-described implementations generated a data message for transmission over the air link for each FSK tone generated by a TDD/TTY terminal. For each five-bit Baudot code, such implementations generate five data messages, one for each bit represented by one FSK tone signal. An alternative implementation might detect the FSK tones for each Baudot character and transmit the five bits in one data message. This alternative implementation should reduce the amount of data transported over the air link.

Also, in the embodiment of the MSC shown in FIG. 3, there were a limited number of processors with the TDD/TTY processing capability. Many other processors continued to provide only normal digital telephone service. In such an implementation, the MSC controller must selectively route the call for a TDD/TTY user through a processor having the TDD/TTY capability. The caller might input a request signifying a desire for the TDD/TTY call treatment during call set-up, or the MSC control processor 77 might recognize the need for TDD/TTY treatment from the profile of the station $3_2$ serving a TDD/TTY user or from detection of a predetermined pattern of FSK tones. An alternative approach would incorporate elements for processing the TDD/TTY signals into each of the vocoder and associated processing circuits 75, so as to be available on an as needed basis on every call through the wireless digital network.

In the embodiment described above, the digital handset and the MSC supported only the digital wireless service. Many handsets and wireless telephone networks today support dual-mode operation in digital and analog. The handset includes digital and analog transceivers and can automatically convert to the analog operation when the digital becomes unavailable. The present invention is readily adaptable to dual-mode operation. For example, if the handset of FIG. 4 included an additional transceiver for analog operation, the handset would include a switch, to bypass the protocol conversion elements for the TDD/TTY, during analog operation. The handset processor would activate the switch to directly connect the analog coupling of the TDD/TTY to the analog transceiver in much the same way that it controls the handset circuitry to bypass the vocoder during analog operation.

As another example, the preferred embodiments above perform the protocol conversion between data messages and PSTN compatible information in the MSC. The conversion elements could be anywhere convenient, within the digital wireless network, for example in the base station. In a PCS type wireless network using radio ports and radio port controllers, the protocol conversion equipment could reside in the radio ports but preferably resides in the radio port controllers.

The illustrated examples of the protocol conversion circuitry in the MSC and at the mobile station used discrete functional elements. Obviously, many of these functions can be combined and/or certain functions performed by specific elements are readily performed by programmable devices.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A mobile switching center, comprising:

a digital switch for establishing selective connections of a port to circuits going to digital wireless base stations;

demultiplexer means, coupled to the port of the digital switch, for separating digital messages representing predetermined tone signals compatible with a data device for an impaired user from vocoded speech samples in a data stream received from one of the wireless base stations;

a vocoder coupled to the demultiplexer means for digitally decoding the vocoded speech samples into representations of analog audio signals;

a decoder, coupled the demultiplexer means, for decoding the digital messages to identify the predetermined tones;

a generator responsive to the decoder, for producing representations of the predetermined tones; and a combiner, coupled to the vocoder and the generator, for combining the representations of analog audio signals and the representations of the predetermined tones into a signal stream for transmission over a telephone network.

2. A mobile switching center as in claim 1, wherein the generator generates representations of frequency shift key modulation tones.

3. A mobile switching center as in claim 1, further comprising:

a tone detector for detecting representations of predetermined tone signals for the data device for the impaired user; and an encoder, coupled to the tone detector, for generating digital data messages corresponding to the detected tone signals for transmission through the one wireless base station.

4. An apparatus as in claim 3, wherein the tone detector detects representations of frequency shift key tone signals.

* * * * *